No. 803,525. PATENTED OCT. 31, 1905.
F. D. COPPAGE.
MACHINE FOR MAKING COTTER PINS.
APPLICATION FILED OCT. 15, 1904.

WITNESSES:
Jas. A. Ryan
Amos W Hart

INVENTOR
F. D. Coppage
BY Munn & Co.
ATTORNEYS.

No. 803,525. PATENTED OCT. 31, 1905.
F. D. COPPAGE.
MACHINE FOR MAKING COTTER PINS.
APPLICATION FILED OCT. 15, 1904.

WITNESSES:
Jos. A. Ryan
Amos W. Hart

INVENTOR
F. D. Coppage
BY Munn & Co.
ATTORNEYS

UNITED STATES PATENT OFFICE.

FREDRICK D. COPPAGE, OF TERRE HAUTE, INDIANA, ASSIGNOR OF ONE-HALF TO WALTER A. PHILLIPS, OF TERRE HAUTE, INDIANA.

MACHINE FOR MAKING COTTER-PINS.

No. 803,525.  Specification of Letters Patent.  Patented Oct. 31, 1905.

Application filed October 15, 1904. Serial No. 228,635.

*To all whom it may concern:*

Be it known that I, FREDRICK D. COPPAGE, a citizen of the United States, and a resident of Terre Haute, in the county of Vigo and State of Indiana, have invented an Improved Machine for Making Cotter-Pins, of which the following is a specification.

My invention is an improvement in machines for making what are known as "cotter-pins" or devices formed by bending a wire blank midway of its length to form an eye, the two arms or legs being brought together and their ends pointed.

The invention is embodied in certain improvements in the parts hereinafter described, the novel features being pointed out in the claims.

The machine is illustrated in the accompanying drawings, in which—

The working parts of the machine are attached to or supported upon a platform or bed 1, which is preferably L-shaped and supported by legs 1ª or any other suitable means.

The automatic operation of the machine depends upon a rotary shaft 2, which is journaled on the rear portion of the platform 1 and provided with a balance-wheel 3 and in practice with a driven pulley. (Not shown.) It is to be understood that the shaft 2 will be driven by any suitable motor. Upon this shaft is mounted a series of cams, by which certain portions of the mechanism are operated, and the same is also provided at one end with a crank 4, which imparts intermittent action to the means for feeding the wire $x$, from which the blanks to form the cotter-pins are successively severed by cutters 5 and 6. (See Figs. 1 and 10.) The wire is guided through grooved feed-rolls 7 and 8 by means of grooved guide-rollers 9, which are journaled under the lateral arm of the platform 1. The feed-rolls 7 and 8 are provided with spur-gears 9', and the roll 7 is provided with a bevel-gear 10. (See Figs. 1 and 2.) The bevel-gear 11 is arranged vertically and meshes with the gear 10, it being mounted loose on the short shaft 12, having its bearings in pendent portions of the supplemental bed 1ᵇ, which is attached to the under side of the main bed but projects from the front thereof, as shown best in Fig. 1. The ratchet-wheel 13 is attached to the gear 11, so as to rotate therewith. As shown best in Fig. 2, a lever-arm 14 is mounted loose on the shaft 12 and provided with a pawl 15, which engages the ratchet 13. A rod 16 connects the lever-arm 14 with the crank 4 of the driving-shaft 2. It is apparent that the rotation of the driving-shaft 2 will impart a reciprocating movement to the lever-arm 14, and that through the medium of the pawl, ratchet, and bevel-gear 11 intermittent rotary motion will be imparted to the feed-rolls 7 and 8, and that thereby the wire $x$ will be advanced intermittently to the cutters 5 and 6.

For the purpose of regulating the pressure between the feed-rolls 7 and 8 I provide the following means: The roll 7 is supported upon a journal, having its bearings in the bed 1 and supplemental bed 1ᵇ and is thus fixed in position. The other roll 8 is adapted for adjustment by reason of the fact that its journal passes through slots in the supplemental bed 1$^b$ and a bracket secured in position above the same and has its bearing in plates 17, (see Fig. 14,) which plates are adjustable and provided with bow-springs 18, against which set-screws 19 bear, the same passing through lugs 20, formed on the supplemental bed 1$^b$ and the bracket 1$^c$. It is obvious that by manipulating the screws 19 the tension of the springs 18 may be regulated to the required degree and the pressure between the feed-rolls 7 and 8 changed correspondingly.

Figure 5:
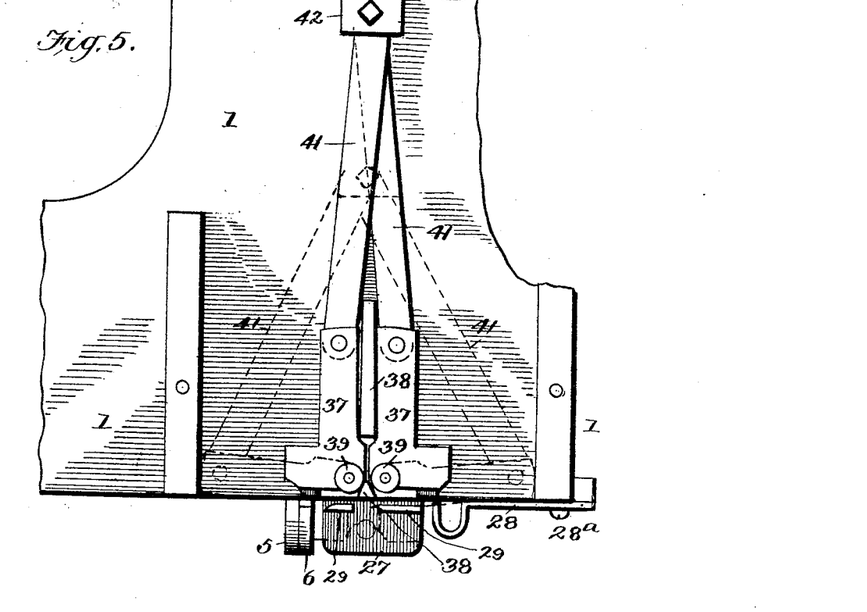
Fig. 5 is a plan view of the blank-lifter and bending or forming jaws, together with adjacent portions of the bed and means for operating the jaws.
Figure 6:
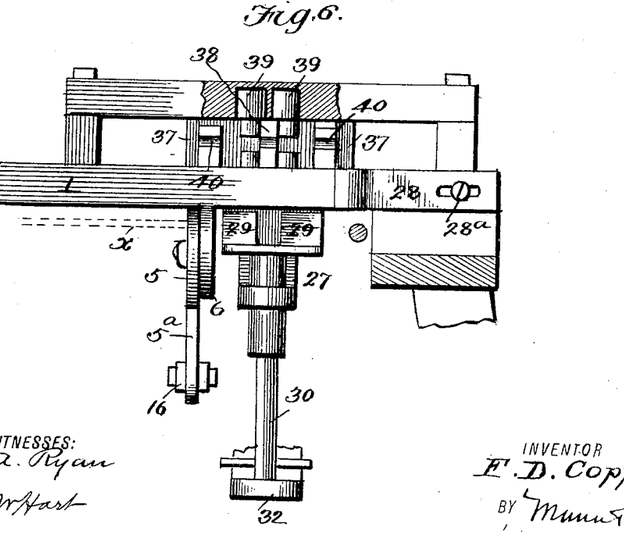
Fig. 6 is mainly a front elevation, parts being shown in section, of the blank-bending jaws, the wire cutters or shears, and the blank-lifter.

The cutters or shears by which the blank is severed from the wire $x$ are formed by a fixed and movable part, as will now be described. The fixed cutter 6 (see Figs. 1 and 10) is practically a steel plate projecting from a suitable support in the front of the bed 1 and provided with a slot (see Fig. 15) through which the wire $x$ is fed. The movable cutter 5 is practically a similar plate provided with a hole which is brought into coincidence with the slot in the cutter 6 to allow the passage of the wire and having a pendent arm 5$^a$, which is connected by a ratchet 21 with the arm of the rock-shaft 22. The latter, as shown in Figs. 2, 3, 4, and 10, is journaled in the bracket 22', pendent from the bed 1 and provided at one end with a lever-arm 23, which is acted upon by a cam 24, and at the other end with a similar arm 25, which is connected with one of the legs or supports of the machine by means of a spiral spring 26. The function of the spring is to hold the movable shear or cutter 5 in such position that the hole therein through which the wire $x$ is fed will be in coincidence with the open slot in the cutter 6, and when the cam 24 comes into action it rocks the shaft 22, and thereby rotates the movable cutter 5, so as to shear or sever a blank from the wire. The blank falls upon the holder and lifter 27. (See Figs. 1, 5, 7, and 9.) It will be understood that just previous to the action of the movable cutter 5 the wire $x$ projects through the two cutters to the length required, which is determined by means of a stop 28, (see Fig. 5,) which is secured by means of a screw 28$^a$, passing through a slot in its shank. The holder 27 has a horizontal portion or table upon which are arranged vertical projections 29 and a cylindrical shank 30, which works in a guide-bracket 31, attached to and pendent from the bed 1. The vertical projections 29 of the lifter 27 are separated from the front of the bed by a narrow space sufficient to accommodate the blank, and into this space the blank falls when severed. The next step is the elevation or vertical movement of the lifter 27 for carrying the blank up to the bending and forming devices. This is effected by means of the trussed lever 32 and cam 33, (see Figs. 7 and 13,) the cam being keyed on the shaft 2 and acting upon the rear and shorter arm of the lever, which is fulcrumed in a hanger 34, attached to the bed 1. The lifter 27 is held normally depressed by a spring 35, (see Fig. 1,) and the cam 33 is so arranged with reference to the cam 24, that operates the shears, and the crank 4, that operates the feed mechanism, that the lifter 27 is raised at the right time or immediately following the shearing action of the cutters. The lifter carries the blank up between the former 36 (see Figs. 1 and 8) and the faces of the bending-jaws 37 and the fixed abutment 38, arranged between the jaws. (See especially Fig. 5.) As shown, the jaws 37 are pivoted oppositely or at adjacent points 39 and are practically L-shaped. When in the retracted position, (shown in full lines, Fig. 5,) the faces of the jaws are alined. As shown, they are provided with transverse grooves 40, and the abutment 38 has a coincident groove for receiving the blank. The former 36 is in the nature of a cylindrical and conical pin, which is arranged directly in front of the abutment 38, so that when the blank is lifted it is forced between it and the said abutment and received in the aforesaid groove, being held there by friction and pressure, as will be readily understood. The lifter 27 then recedes to its normal position, (shown in Figs. 1 and 6,) and the bending-jaws come into action. As shown best in Figs. 4 and 5, the shanks of the jaws are pivotally connected by bars 41 with a slidable plunger 42, the latter working in suitable guide 43 and acted upon by the cam 44 against the tension of the spring 45—that is to say, while the cam which is mounted on the shaft 2 serves to advance the plunger 42, and thereby actuates the jaws, as will be presently described, the spring serves merely to retract the jaws, as will be readily understood. The cam acts upon the antifriction-roller 42$^a$, which is journaled in the adjacent end of the plunger 42. It will be seen that the bars 41 are practically toggle-levers and that the more widely they are separated as the plunger 42 advances the greater is the leverage applied until the faces of the jaws are brought together and closed upon the blank, as shown by dotted lines, Fig. 5. (See also Fig. 8.) It will be understood that in this operation the central portion of the blank is bent around the former 36 and that when the faces of the jaws meet the blank lies in the space provided by the grooves 40. While the blank now formed into a cotter-pin is thus held projecting from between the jaws 37, the pointing device comes into action, as will be presently described.

Figure 10:
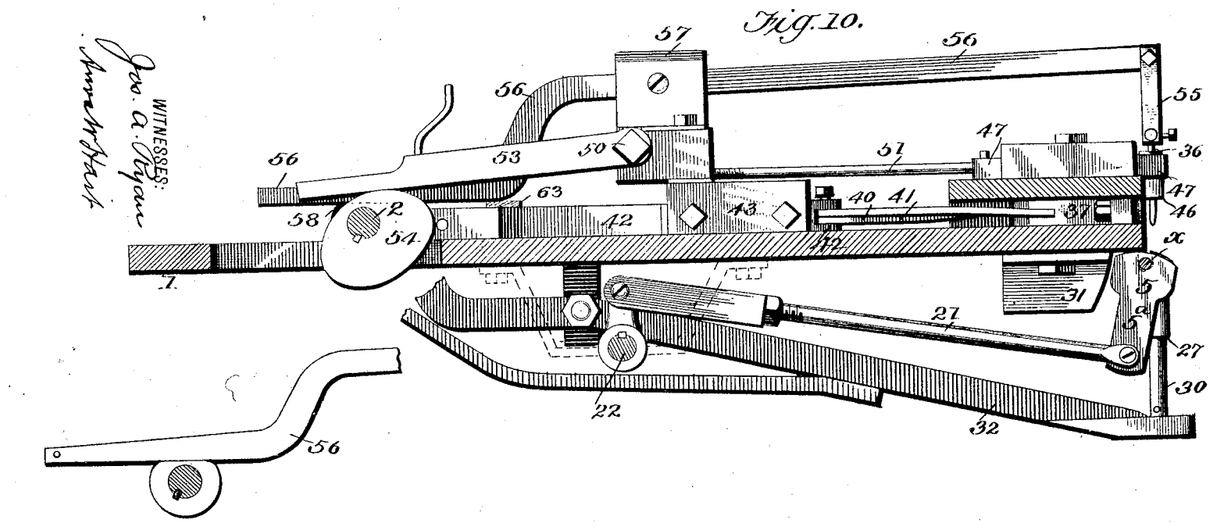
Fig. 10 is a longitudinal vertical section of the machine, taken substantially on the line 10 10 of Fig. 4.
Figure 11:
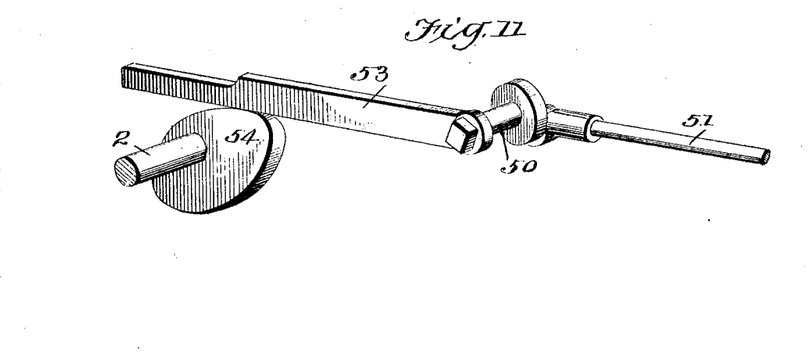
Fig. 11 is a perspective view illustrating the means for operating the holder or guide in which works the former around which the cotter-blank is bent.

The cylindrical former 36 has two movements now to be described. It is adapted to reciprocate vertically in the guide 46 (see Fig. 7) so that it may be withdrawn from the eye of the cotter-pin when the latter has been duly shaped and pointed, and the guide is clamped in a horizontal reciprocable carrier 47 by means of a clamp-screw 48. The said carrier is practically a bar adapted to slide on the guide 49 and operated from the crank of a rock-shaft 50 by means of a rod 51. (See Fig. 11.) The said shaft 50 has its bearings in the bracket 52, supported upon the bed 1, and is provided with a rigid lever-arm 53, that rests upon a cam 54. It is obvious that the rotation of the cam 54 will rock the shaft 50, and thus impart reciprocation to the horizontal carrier 47 through the medium of the connecting-rod 51, and it will be further understood that when the cam 54 reaches its highest point its action will draw the former 36 close to the front or face of the jaws 37. It is while the former is so held that the jaws are actuated for bending the blank around it, as before described. As the cam 54 continues to rotate the weighted arm 53 will fall, (or be depressed by the action of a spring, if found necessary,) and thereby, the shaft 50 rocking in a reverse direction to that before stated, the carrier 47 will move the former 36 so as to release the cotter-pin from contact with the abutment 38. At this time the cotter-pin will still adhere to the former 36 by friction, and it is therefore necessary that the former be drawn upward in order to free it from the cotter-pin. It is for this purpose it is adapted to slide in the vertical guide 46, (see Fig. 7,) and the action is produced in the following manner: As shown in Figs. 1, 2, 3, and 10, links 55 connect the former with a lever 56, which is pivoted in a rigid bracket 57, its rear end being curved downward and extended horizontally to adapt it for coaction with the cam 58 and it being held in working contact therewith by means of a spring 59. (See Figs. 2 and 3.) It will be understood that the spring retracts the former 36 through the coaction of the lever 56 and link 55 when the cam 58 is in its lowest position and that the former is moved down again for engagement with the blank when the cam is at its highest position. The first or retracted position is shown in Fig. 10, while in Fig. 7 the former 36 is shown at its lowest position, but not in the nearest position to the jaws 37.

As has already been stated, the wire is arrested when forced through the cutters by means of an adjustable stop 28 (see Fig. 5) and when severed falls upon the lifter 27. For the purpose of guiding the blank in its forward movement as the lifter is raised and preventing it from moving endwise to the slightest degree I provide vertical guides 60, (see Figs. 1, 4, and 8,) the same being formed of narrow right-angular plates, one arm of which is arranged vertical and the other horizontal. The horizontal arm is connected adjustably by slot and screw 61 with rods 62, which extend back and are rigidly connected with the arms 63, forming an attachment of the slidable plunger 42. Thus the rods 62 and the guides 60 move with the plunger, and consequently with the jaws 37—that is to say, when the blank is being lifted the guides 60 are close up to the bed and practically in contact with the faces of the jaws 37; but when the jaws begin to act on the blank they bend it into the required form, the plunger being advanced for this purpose, and it is obvious that the guides 60 will be moved away or directly outward from the jaws, since they have no longer any function.

Figures 12, 13, 14, 15, 16, 17:
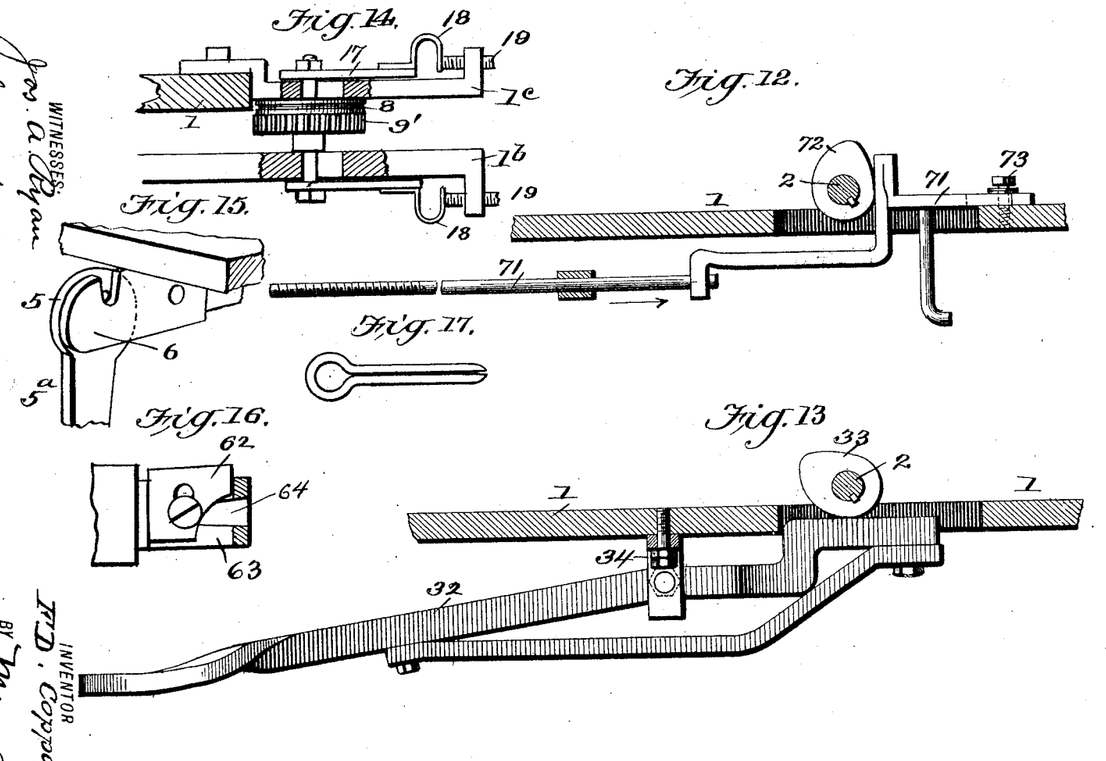
Fig. 12 is a detail vertical section illustrating the means for reciprocating the device by which the cotter-pin is pointed.
Fig. 13 is a vertical longitudinal section illustrating the means by which the blank-lifter is raised.
Fig. 14 is a view illustrating adjustable spring-bearings for one of the rolls by which the wire is fed to the cutter.
Fig. 15 is a detail view illustrating the cutters or shears for severing the blank.
Fig. 16 is a view illustrating the rotary pointing device.
Fig. 17 is a view of the cotter-pin formed by the machine.

As before stated, while the pin formed by the bending of the wire around the former 36 is still held between the jaws 37 the device for pointing it is advanced and operated. This device is formed (see Figs. 1 and 16) by means of a notched cutter 62 and a rotary head 63, to which it is attached. The said head has a conical socket 64, which receives the point of the cotter-pin, and as the head is rotated the edge of the cutter 62 acts thereon for shaving off a portion, and thus making it conical to the required degree. The said head is part of a rotary shaft 65, which is mounted in a bearing 67 and is provided with a fast pulley 68, to which rotation is imparted by a belt from a suitable motor. The bearing 67 has an enlarged base which is adapted to slide in a guideway 69, forming an attachment of the supplemental bed $1^b$. The bearing 67 is normally retracted by a spiral spring 70, and the same is advanced for moving the pointing device up to the cotter-pin by means of a rod 71 (see Fig. 12) and a cam 72, which is keyed upon the shaft 2—that is to say, the cam 72 moves the rod 71 in direction of the arrow, Fig. 12, and in opposition to the tension of the spring 70, which when the pointing of the cotter-pin has been effected retracts the pointing device to its normal position. As shown in Fig. 12, the rear upper portion of the rod 71 rests upon the bed 1 and is slotted and provided with a guide-screw 73, so that it is held in due alinement with the cam.

Figure 1:
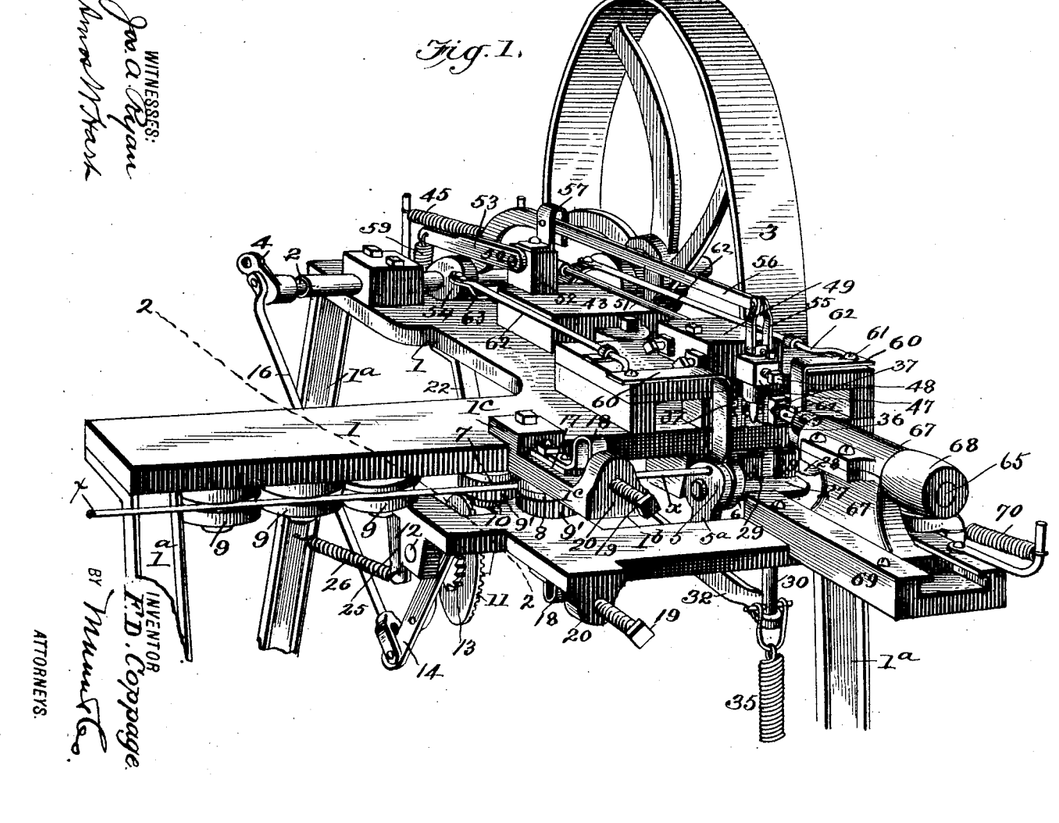
Figure 1 is a perspective view of the entire machine.
Figure 2:
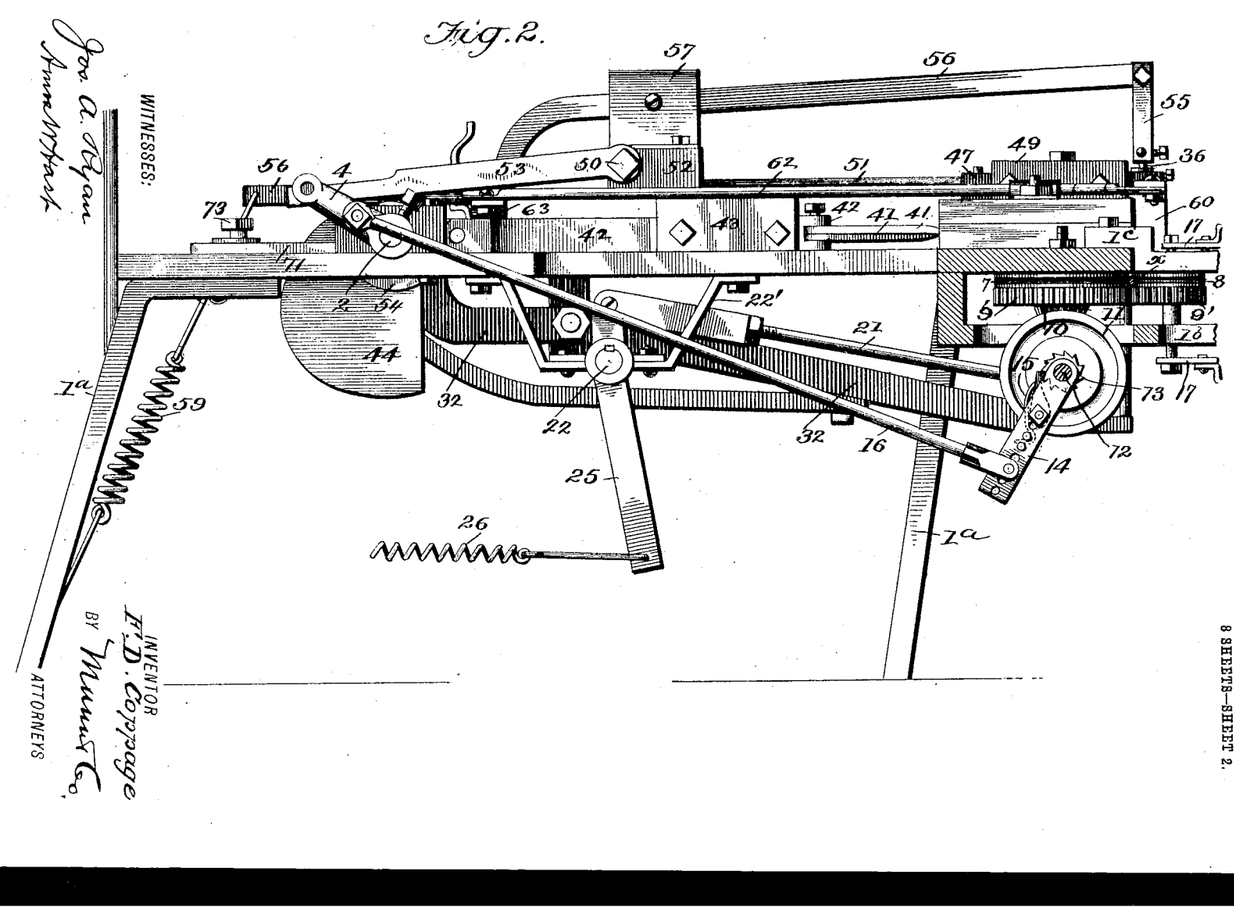
Fig. 2 is mainly a side view, a portion being in section on the line 2 2 of Fig. 1.
Figure 3:
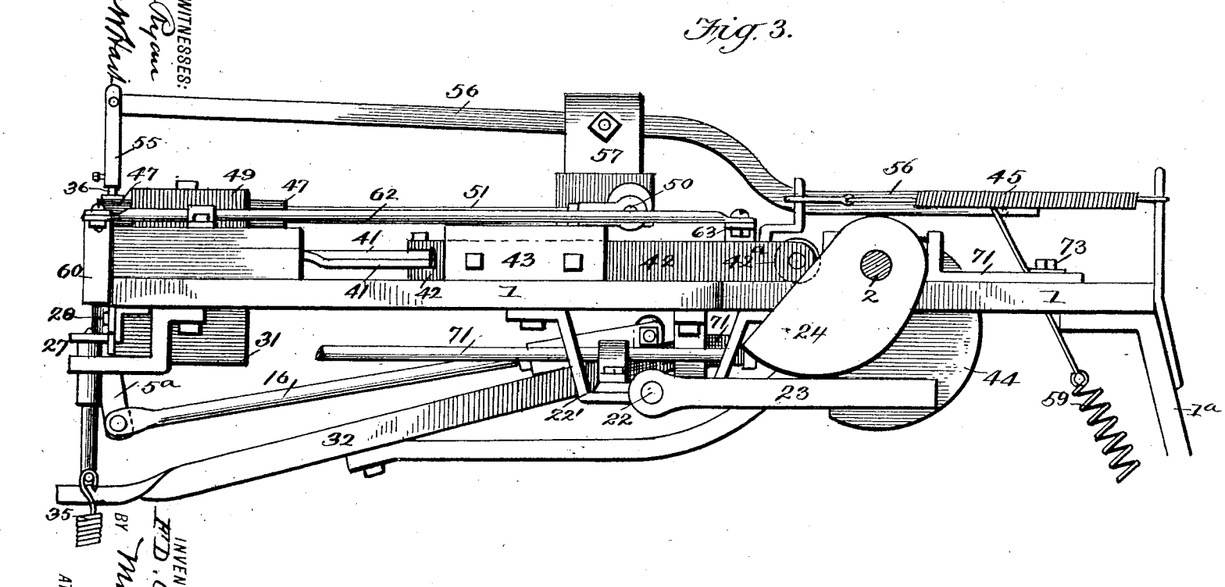
Fig. 3 is a view of the opposite side of the machine from that shown in Fig. 2.
Figure 4:
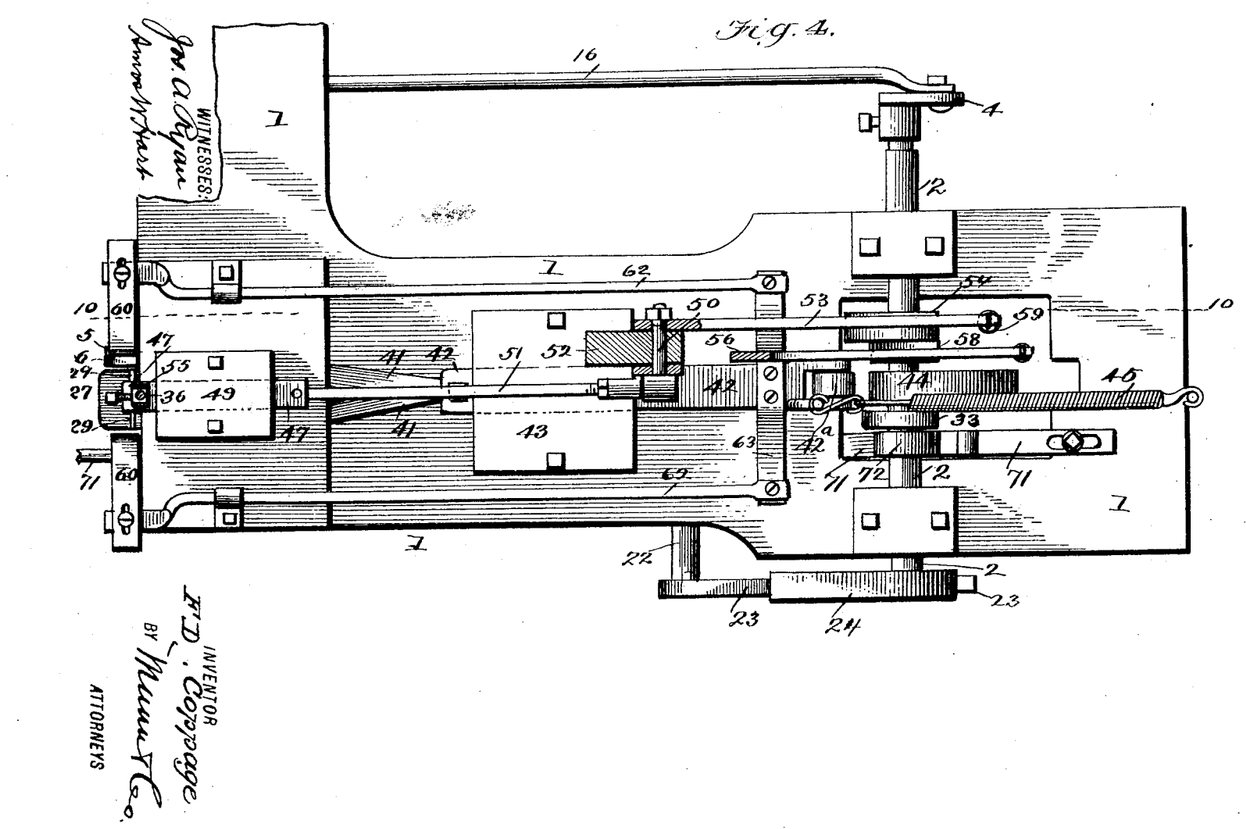
Fig. 4 is mainly a plan view of the machine.
Figures 7, 8, 9:
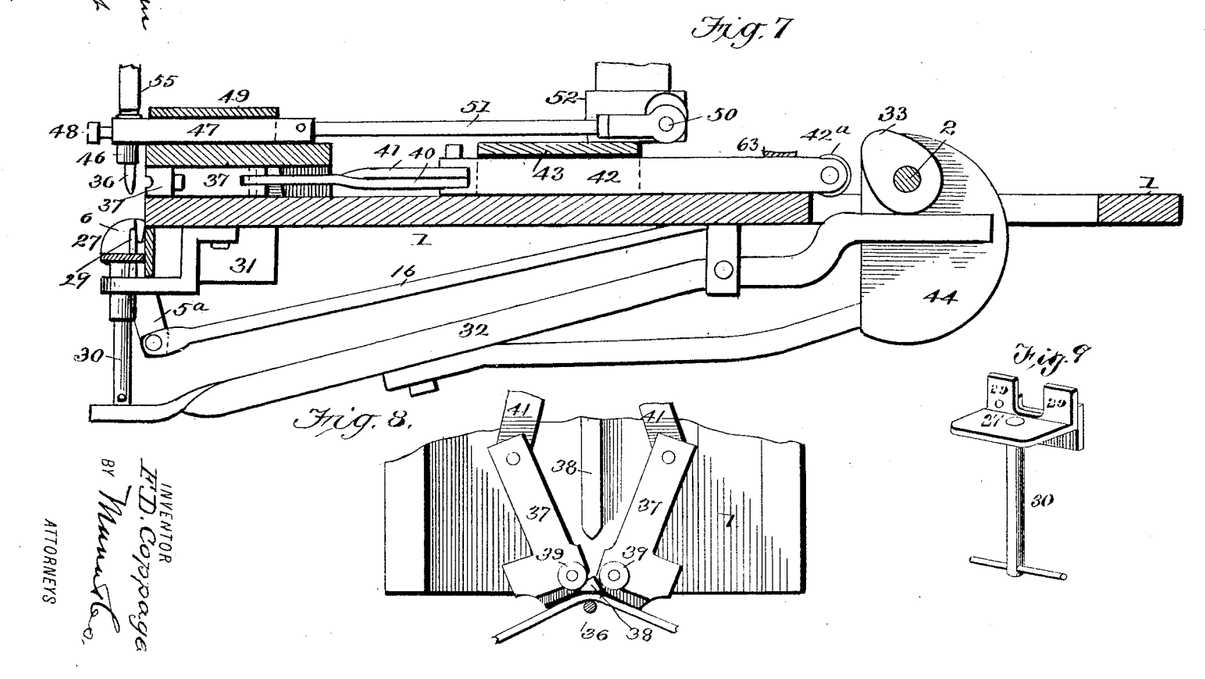
Fig. 7 is a vertical longitudinal section of the machine, taken practically through the center thereof.
Fig. 8 is a plan view illustrating the coaction of the blank, the bending-jaws, and other coöperating adjacent parts.
Fig. 9 is a perspective view of the blank-lifter.

To recapitulate, the operation of the machine is as follows: The wire $x$ having been introduced between the feed-rollers 7 8 and inserted in the coincident openings of the cutters 5 6, through the rotation of the shaft 2 the ratchet-lever 14 is operated to rotate the feed-rollers 7 8, whereby the wire is fed through the cutters and up to the adjustable stop 28, whereupon the movable cutter 5 is actuated to sever the blank to the required length, which falls upon the lifter 27 and behind the vertical projections 29 thereof. At this time the vertical guides 60 are in the position indicated in Fig. 1—that is to say, close up to the edge of the bed 1 and practically in contact with the faces of the jaws 37. The lifter 27 is raised and carries the blank up between the guides 60 and into the space between the former 36 and the fixed abutment 38 and the alined faces of the jaws until it rests in the grooves 40 in the latter. It will be understood that at this time the carrier 47, in which the former 36 is supported, is retracted so that there is only sufficient space between it and the jaws to allow the blank to be thus forced upward. In order to allow such upward movement of the blank, the point of the former is made conical, as shown in Figs. 1 and 7. It will be noted (see Fig. 1) that the vertical projections or lugs 29 of the blank-lifter are separated correspondingly by a space sufficient to receive the former 36 as the lifter rises. The next action is the advancement of the plunger 42, by which the right-angular jaws 37 are swung on their pivots 39 (see Fig. 8) and the blank thus bent at its central point around the former 36 until the faces of the jaws meet, whereby the cotter-pin is practically formed complete, save the conical point, which is produced by subsequent action of the pointing device, as before described. The pointing having been effected, the carrier in which the former 36 is held is advanced, so as to carry the former slightly away from the abutment 38, and the jaws are also retracted while the former is raised to free it entirely from the completed cotter-pin, which then drops into a suitable receptacle provided for the purpose.

What I claim is—

1. The combination, with the bed of the machine, of a fixed abutment thereon, a former arranged vertically in front of the abutment and spaced therefrom so as to receive and closely embrace a blank, devices arranged adjacent for bending the blank around the former, and a vertically-movable device for carrying the blank into the space between the former and the abutment, substantially as described.

2. The combination, with the pivoted jaws having horizontal grooves in their faces, an intermediate abutment having a coincident groove, a former located in front of the abutment and spaced therefrom so as to receive and embrace a blank, and a vertically-movable device adapted for carrying the blank into said grooves and behind the former, substantially as described.

3. The combination, with the pivoted jaws, a former for bending a blank to form a cotter-pin as described, and means for raising the blank into engagement with the former, of vertical guides which are pendent opposite each other on each side of the former, means for operating the jaws, and means connecting them with said guides whereby the latter are movable forward out of the way of the jaws as the latter close upon the blank, substantially as described.

4. The combination, with a fixed abutment and a former arranged in front thereof, and means for raising the blank into the space between the former and the abutment, of jaws pivoted adjacently and adapted for bending a blank around the former, a horizontally-slidable carrier in which the former is held, and means for moving the said carrier for the purpose of adjusting the former close to or farther from the abutment and the jaws, as required to hold a blank and release the completed pin, substantially as described.

5. The combination, with a fixed abutment the former arranged vertically and jaws pivoted adjacently equidistantly and adapted to act upon a blank for imparting the required shape, and means for raising a blank into engagement with the former, a horizontally-movable carrier for the former the latter being vertically slidable therein, and means arranged in connection with the said former and its carrier for adjusting it toward and from the abutment and lifting it vertically at required times, substantially as described.

6. The combination, with a fixed abutment and a former which is normally pendent in front thereof, and spaced therefrom substantially the thickness of the stock so as to grip it when in one position, grooved jaws pivoted adjacent to the former and on opposite sides of the abutment contiguous to its face, a carrier for the former which is movable horizontally, the former being also movable vertically, a rock-shaft, and means for connecting it with said carrier, an arm rigidly connected with the said rock-shaft and operated by a rotary cam, and a spring holding it in contact therewith, a pivoted lever and links for connecting it with the former, and a rotary cam and spring for actuating the former vertically, substantially as described.

FREDRICK D. COPPAGE.

Witnesses:
 WALTER A. PHILLIPS,
 MATTIE J. HERBERT.